(12) United States Patent
Lesche

(10) Patent No.: US 8,122,740 B2
(45) Date of Patent: Feb. 28, 2012

(54) METHOD FOR GENERATING RAISED OR RECESSED STRUCTURES ON HOLLOW BODIES, PREFERABLY COMPRISED OF GLASS

(75) Inventor: Klaus Lesche, Kirchberg im Wald (DE)

(73) Assignee: Zwiesel Kristallglas AG (DE)

( * ) Notice: Subject to any disclaimer, the term of this patent is extended or adjusted under 35 U.S.C. 154(b) by 307 days.

(21) Appl. No.: 12/421,298

(22) Filed: Apr. 9, 2009

(65) Prior Publication Data
US 2009/0256286 A1    Oct. 15, 2009

(30) Foreign Application Priority Data

Apr. 9, 2008    (DE) .......................... 10 2008 018 042
Sep. 26, 2008    (DE) .......................... 10 2008 048 907

(51) Int. Cl.
*C03B 29/00* (2006.01)
*B23K 26/00* (2006.01)

(52) U.S. Cl. ....... 65/102; 264/400; 264/482; 219/121.6; 219/121.61; 219/121.62; 219/121.66

(58) Field of Classification Search ..................... 65/102; 219/121.6–121.86
See application file for complete search history.

(56) References Cited

U.S. PATENT DOCUMENTS

| | | | |
|---|---|---|---|
| 2,722,086 A * | 11/1955 | Mullen | 65/105 |
| 3,322,524 A | 5/1967 | Chanowitz | |
| 3,573,891 A | 4/1971 | Ayres | |
| 3,663,793 A * | 5/1972 | Petro et al. | 219/121.69 |
| 3,765,994 A * | 10/1973 | Quaintance et al. | 430/5 |
| 4,057,409 A | 11/1977 | Kudryavtsev et al. | |
| 4,682,003 A * | 7/1987 | Minakawa et al. | 219/121.72 |
| 4,994,058 A * | 2/1991 | Raven et al. | 606/5 |
| 5,737,126 A | 4/1998 | Lawandy | |
| 5,955,154 A * | 9/1999 | Xuan et al. | 427/555 |
| 6,299,429 B1 * | 10/2001 | Xuan | 425/174.4 |
| 6,394,520 B1 * | 5/2002 | Quick et al. | 294/185 |
| 7,505,650 B1 * | 3/2009 | Grzybowski et al. | 385/33 |
| 2007/0199930 A1 * | 8/2007 | McElroy et al. | 219/121.86 |
| 2007/0201797 A1 * | 8/2007 | Grzybowski et al. | 385/52 |
| 2010/0050692 A1 * | 3/2010 | Logunov et al. | 65/31 |

FOREIGN PATENT DOCUMENTS

| | | |
|---|---|---|
| JP | 57111250 | 7/1982 |
| JP | 62202828 | 9/1987 |

OTHER PUBLICATIONS

English Abstract of JP 62202828 A Sep. 7, 1987.
English Abstract of JP 57-111250, Jul. 10, 1982.

* cited by examiner

*Primary Examiner* — Matthew Daniels
*Assistant Examiner* — Jodi C Franklin
(74) *Attorney, Agent, or Firm* — Price Heneveld LLP

(57) ABSTRACT

The invention relates to a method for the generation of raised and/or recessed structures on workpieces comprising the steps: applying a pressure difference between one side of a wall of the workpiece and another side substantially opposite thereto; local heating of the wall of the workpiece to a softening temperature of the workpiece by a heat source in order to induce local deformation of the wall of the workpiece; and cooling of the workpiece. The invention relates, moreover, to an apparatus for carrying out this method.

7 Claims, 3 Drawing Sheets

METHOD FOR GENERATING RAISED OR RECESSED STRUCTURES ON HOLLOW BODIES, PREFERABLY COMPRISED OF GLASS

BACKGROUND OF THE INVENTION

The present invention relates to a method for the generation of raised or recessed structures on workpieces as well as to a corresponding apparatus for carrying out the method.

Various products or workpieces, such as, for example, glass products, are provided during their production to some extent with projections, offsets, elevations, etc. (raised structures) and/or indentations, depressions, grooves, etc. (recessed structures). These raised and recessed structures are generated simultaneously with the production of the product or workpiece or glass body, by blowing, for example, a glass gob into an empty metallic mold which has the desired structure (settle blow). The quality, i.e. dimensions, roughness, etc. of the raised and recessed structures generated as a result, however, are relatively low. Thus, the generated glass product gives the user the impression of it being of cheap or low quality. There is, consequently, a need for an improvement of the raised or recessed structures with respect to their quality.

The invention therefore addresses the problem of providing a method for the generation of raised and recessed structures, with which qualitatively high-grade products or workpieces can be generated.

SUMMARY OF THE INVENTION

This problem is solved through a method for generating raised and/or recessed structures on workpieces or products or walls thereof or lumens, comprising the steps: applying a pressure difference between one side of a wall (of the workpiece) and another inner and an outer side of a wall, substantially opposite to the former, or between the interior of a hollow body and the exterior of the hollow body; local heating of the wall of the workpiece to a softening temperature of the (material of the) workpiece by a heat source in order to induce local deformation of the wall of the workpiece; and cooling of the workpiece.

According to another aspect of the invention, an apparatus is provided for generating raised and/or recessed structures on a workpiece, the apparatus comprising: a pressure difference generation device for applying a pressure difference between one side of a wall of the workpiece and another side substantially opposite thereto; and a heat source for local heating of the wall of the workpiece by means of a heat source to a softening temperature of the workpiece in order to induce local deformation of the wall of the workpiece.

BRIEF DESCRIPTION OF THE DRAWINGS

The invention will be explained in further detail in conjunction with the following enclosed drawings.

DETAILED DESCRIPTION OF THE PREFERRED EMBODIMENTS

Figure 1:
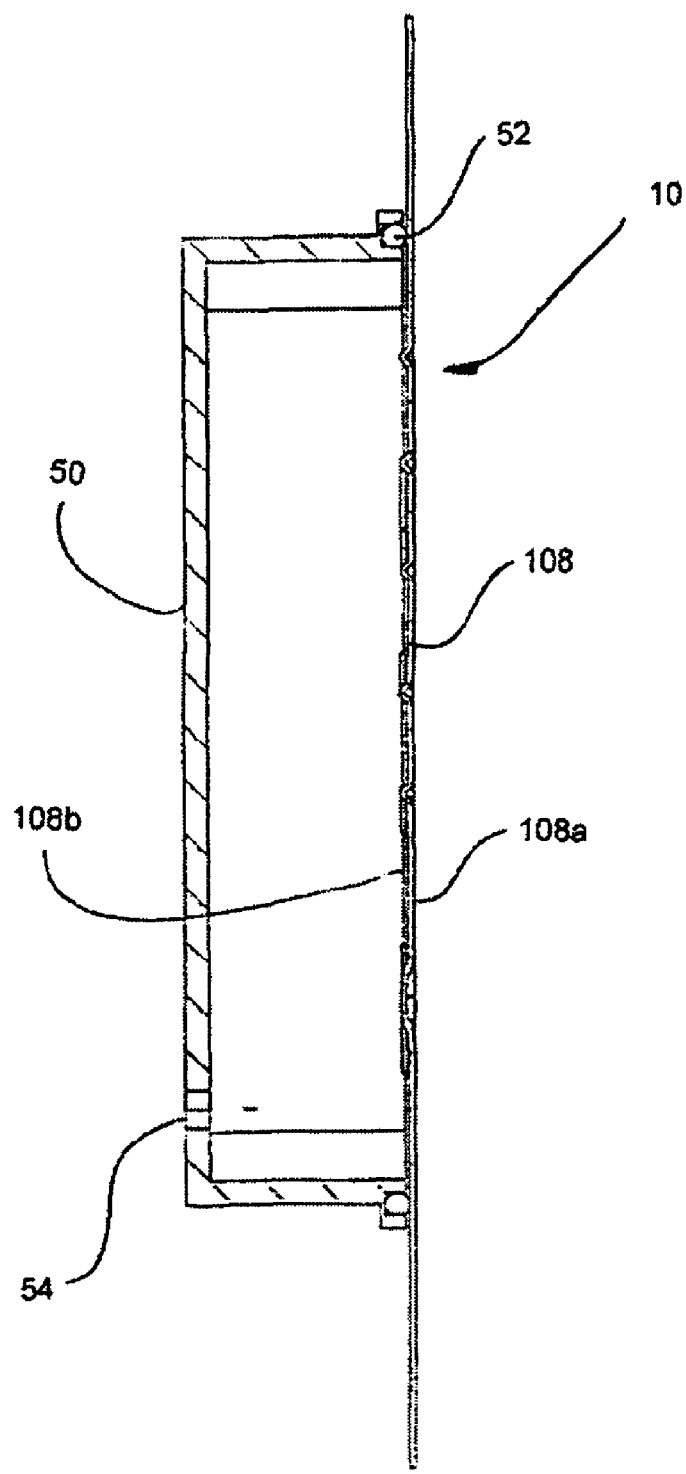
FIG. 1 depicts a planar plate as a workpiece on which raised or recessed structures are to be generated.

The method according to a preferred embodiment makes available a high degree of latitude since, due to the heating of the workpiece and/or of the wall, which is locally limited, any desired structures can be shaped or formed. The degree of deformation can, moreover, be determined or controlled by applying an appropriate pressure difference. Expressed differently, a high degree of deformation can be generated by a high pressure difference, while a low degree of deformation can be generated by a low pressure difference. Alternatively, or additionally, the degree of deformation can be controlled by controlling the heating temperature of the workpiece. This means that by generating a relatively low temperature, the degree of deformation can be reduced, while by generating a higher heating temperature, the degree of deformation can be increased.

A hollow body (cup) of an already blown or pressed glass product, for example, can be heated only locally in order to bring about a local deformation. In such a manner, the raised or recessed structure can subsequently be generated on an already pressed or blown glass product.

In summary, it can be stated that a degree of deformation can be determined, on the one hand, by controlling the pressure difference and, on the other hand, by controlling the local heating temperature. The cooling can take place passively by exposing the product to ambient temperature or actively by cooling means.

The pressure difference is preferably applied on the wall to be worked or to be shaped thereby that a hollow body, such as a tub or bowl or can, is placed or positioned on one and/or the other side of the wall and within the hollow body an under-pressure or an over-pressure is generated. Further preferred, the hollow body is sealed, for example by means of a seal, on the wall in order to be able to maintain the under-/over-pressure for a relatively long time.

The step of heating is preferably carried out by means of a laser beam, optimally by means of a $CO_2$ laser. A laser unit has the advantage that the energy for the heating can be highly concentrated in order to expose highly precisely and selectively certain regions on the workpiece to strong heating. Thus, even extremely finely structured formations can be generated on the product.

To generate specific lineaments of elevations or indentations on the workpiece, the heat source is preferably moved along a predetermined path on the workpiece. The user has hereby a further ability for controlling the energy introduction into specific local regions of the workpiece. In this manner, qualitatively high-grade and outstandingly well reproducible structures can be generated on the workpiece.

The heat source capacity and/or the speed of travel of the heat source is preferably controlled or regulated by means of an appropriate control or regulation device. There is thus a further feasibility for the control or formation of the generatable structures on the workpiece.

Furthermore, the position and/or contour of the workpiece is preferably acquired by means of an optical acquisition unit, such as, for example, a two-dimensional (2D) scanner optics or a three-dimensional (3D) scanner optics or any other desired optical acquisition unit such as, for example, a light barrier, an optical sensor, a CCD camera or the like. In this manner the predetermined path of the heat source can be calculated and traversed on the basis of the acquired position and/or contour of the workpiece in order to generate the desired raised or recessed structures with predetermined heights and/or depths at predetermined sites on the workpiece.

Preferably, with the aid of the same optical acquisition unit or a separate optical acquisition unit the wall thickness of the wall of the workpiece is measured and the travel speed and heat source capacity are corrected based on the measured wall thickness. The shaping of the raised or recessed structures as well as of the entire finished workpiece can thereby be further improved since the discrepancies of the wall thickness of the workpiece to be worked are taken into consideration. In regions with thinner wall thickness, a lower heat source capacity is necessary and/or the travel speed can potentially be increased in order to generate a predetermined elevation or indentation on the workpiece. Conversely, in regions of increased wall thickness, a higher heat source capacity or possibly a lower travel speed or both is required in order to generate a predetermined structure on the workpiece. By measuring the wall thickness and corresponding correction of travel speed and/or heat source capacity, the structure can accordingly be generated with higher precision in order to convey a qualitatively high-grade impression.

The degree of reshaping of the workpiece is preferably also continuously measured during the reshaping with the same or another optical measuring unit in order to provide further correction feasibilities for correcting the travel speed and/or heat source capacity. This has the advantage that a predetermined degree of reshaping is measured directly and an appropriate intervention in the control or regulation can be undertaken in order to control or regulate travel speed and/or heat source capacity such that the predetermined degree of reshaping is attained.

The workpiece can additionally be selectively cooled by applying a gas stream in order to initiate a predetermined solidification of the generated structures. Nitrogen or air is herein preferably utilized as the gas.

If the workpiece includes a hollow body, such as, for example, a cup, for the application of the pressure difference, preferably an opening of the hollow body is closed, for example, using a silicone-coated aluminum plate. However, any other plate or closure means can also be utilized provided the interior volume of the hollow body is adequately sealed off against an outside in order to apply a desired pressure difference between the interior and the exterior of the hollow body. The silicone-coated aluminum plate offers the advantage of good sealing and good heat removal without being deformed in the process of introducing the heat.

With the method according to the invention, preferably a cup of a drinking glass as a hollow body is provided with the raised or recessed structures. However, it is understood that any other glass product can be provided with such structures using the method according to the invention. The method according to the invention is furthermore not limited to the working of glass, but rather can also be applied in the case of other materials, such as, for example, sheet metal or synthetic material.

The invention relates further to an apparatus for carrying out the above described method with a pressure difference generation device and a suitable heat source.

As the heat source, preferably a laser, optimally a $CO_2$ laser, is utilized such that the introduced thermal energy can be very strongly concentrated and be introduced highly precisely selectively at predetermined sites.

The apparatus comprises further a motive device for moving the heat source along a surface of the workpiece.

It is moreover further preferred to provide a control and regulation device for the control or regulation of the heat source capacity and/or of the travel speed of the heat source.

Even further preferred is, moreover, to provide an optical acquisition unit for acquiring the position and/or contour of the workpiece and a calculation device for calculating the predetermined path of the heat source based on the acquired position and/or contour of the workpiece.

Further preferred is to provide a measurement device for the continuous measuring of the wall thickness of the wall of the workpiece and a correction device for correcting the travel speed and/or the heat source capacity based on the measured wall thickness.

Furthermore, the apparatus is preferably provided a measurement device for the continuous measurement of a degree of reshaping of the workpiece and a correction device for correcting the travel speed and/or the heat source capacity based on the measured degree of reshaping.

Further preferred is to provide a gas supply device for cooling the workpiece by means of applying a gas stream.

The substantially planar plate depicted in FIG. 1 is intended as an exemplary workpiece 10 on which the raised or recessed structures are generated. This plate can be comprised of glass, synthetic material or sheet metal. However, another workpiece 10, which has a substantially planar wall 108, can also be deformed. Furthermore, the cup 10 of the drinking glass 1 of FIG. 3 can serve as the workpiece to be worked.

For this purpose the wall 108 of the workpiece 10 is placed on an opening of a hollow body 50 or a tub or can and here preferably sealed by means of a seal 52. This seal 52 can be implemented, for example, as an O-ring with a circular cross section and preferably comprises silicone, rubber, aluminum, copper or the like.

In the interior of the hollow body 50 subsequently an over- or under-pressure is generated thereby that a vacuum pump and/or a pressurization device (not shown) is connected to the interior of the hollow body 50 by means of the under- or over-pressure port 54.

Figure 3:
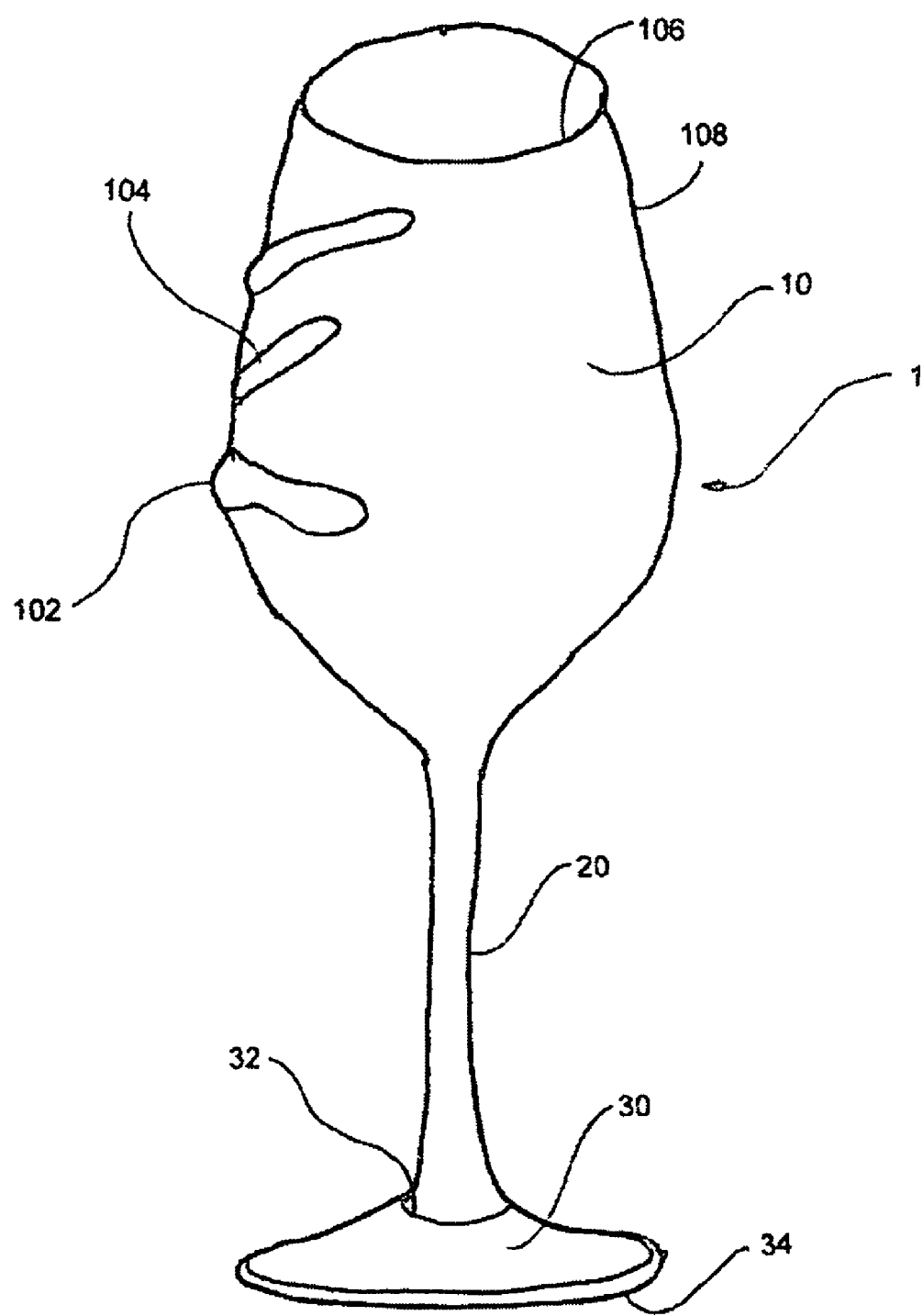
FIG. 3 depicts a wine glass as an exemplary hollow body which is to be provided with corresponding raised and/or recessed structures using the method according to the invention.

The drinking glass 1 depicted in FIG. 3 shows a further example of a workpiece to be worked and includes a bottom 30, a stem 20 and a cup 10.

In such a manner, a differential pressure is generated between the opposite sides 108a, 108b of wall 108 (see FIG. 1) or between the interior of the cup 10 and the exterior of the cup 10 (see FIG. 3). By locally heating the wall 108 of the workpiece 10, the wall 108 is locally heated up to the softening temperature of the workpiece 10. Through the applied pressure difference, in the presence of over-pressure in the interior of the hollow body 50, a raised or recessed structure is generated on wall 108. In the converse case is generated, under under-pressure in the interior of the hollow body 50, a recessed structure (indentation, groove, etc.) on the wall 108 of the workpiece 10. After the cooling of the locally heated sites on wall 108, these sites are hardened in the deformed shape. In this manner a permanent deformation on the wall 108 of the workpiece 10 remains.

Figure 2:
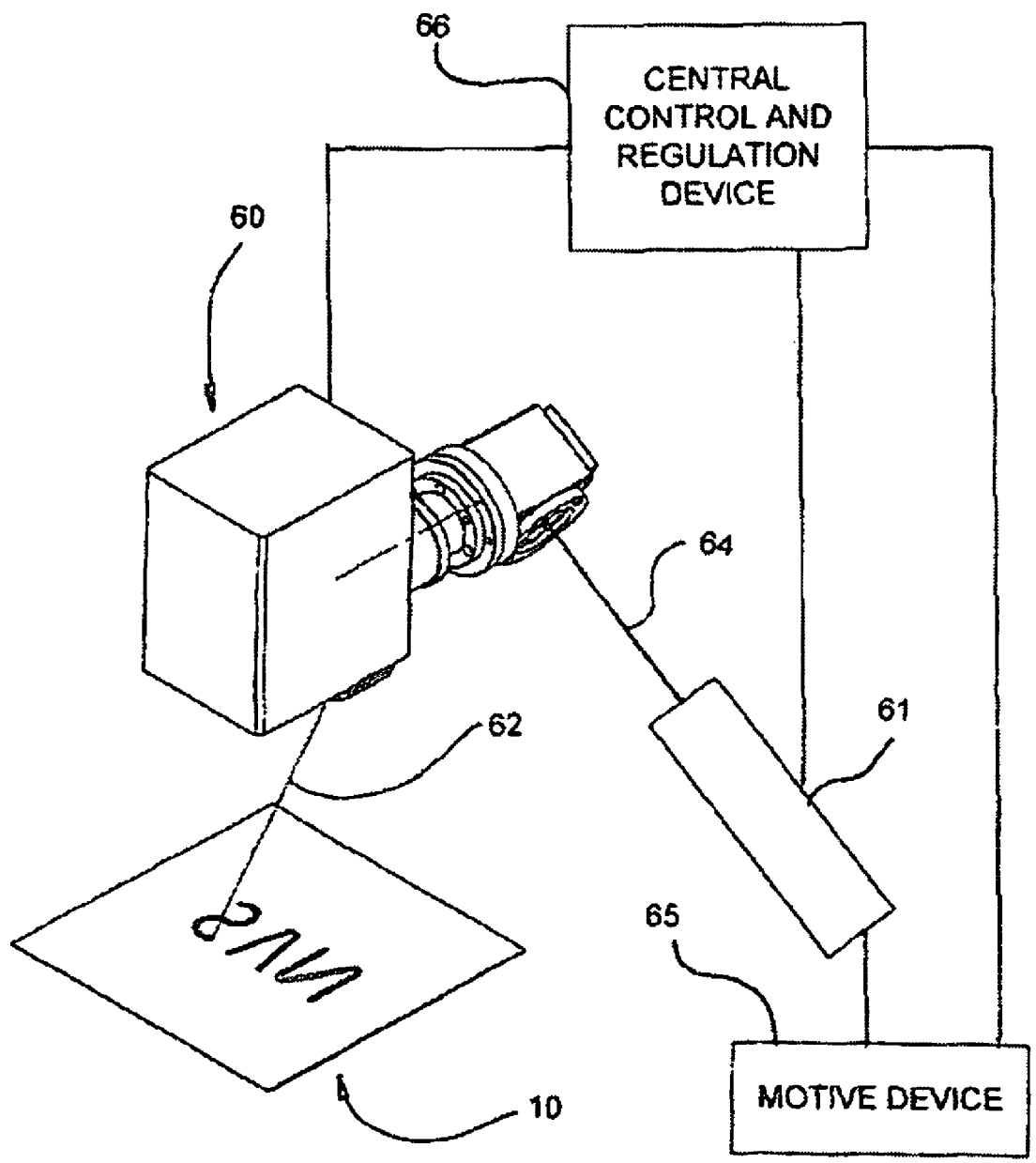
FIG. 2 depicts an embodiment of an apparatus for performing the inventive method, where the apparatus comprises a laser unit as the preferred heat source for softening a wall of the workpiece.

As shown in FIG. 2, the heat source, preferably a laser unit 61 such as a $CO_2$ laser, is utilized since in this manner the introduced energy for heating the workpiece can be extremely highly concentrated and very fine and qualitatively high-grade structures can be generated on the wall 108 of the workpiece 10. A 2D scanner 60 is preferably provided, which deflects a raw laser beam 64 as the laser beam 62 onto a predetermined or predeterminable or desired path. Alternatively, or additionally, the laser unit is coupled with a motive device 65 in order to move the laser beam 62 along a predetermined or predeterminable or desired path on the wall 108 of the workpiece 10. Lines, elevations, indentations, depressions, flutes, pattern, etc. can be formed, as desired, on the wall 108. The differential pressure generation device is preferably controllable or regulatable between a low pressure of 0.02 bar up to a high pressure of 2 bar, optimally between a low pressure of 0.02 bar up to a high pressure of 5 bar.

The laser unit as well as also the motive device is further preferably coupled with a central control and regulation device 66 in order to be able to control or regulate the heat source capacity and the travel speed in correspondence with the predetermined pattern or the nominal structure.

Furthermore, an optical acquisition unit is preferably provided in order to acquire, before the working, the contour and position of the product to be worked. In such a manner, using the central control and regulation device, the predetermined path of the heat source can preferably be calculated on the basis of the acquired position and contour of the workpiece. It is, however, not necessary to provide a central control and regulation device for this purpose, the optical acquisition unit can rather also be separately controlled and regulated if it is correspondingly coupled with the control and regulation device for the heat source capacity and travel speed of the heat source.

The optical acquisition unit is preferably a 2D laser optics or a 3D laser optics. However, any other optical acquisition unit, such as, for example, a light barrier, an optical sensor, a CCD camera or the like, can also be utilized if predetermined known lines on the workpiece are acquired. Such lines can be, for example, the upper and lower margin line 32, 34 of bottom 30 or the opening 106 of the cup 10 of the drinking glass 1 depicted in FIG. 3. Expressed differently, by acquiring the position of these known lines 32, 34 on bottom 30 or at the opening 106 of the cup 10, can the contour and position of the known glass 1 be acquired precisely. On the basis of the acquired contour and position of the workpiece, the predetermined path of the heat source for the generation of the raised or recessed structure 102, 104 can be calculated.

The wall thickness of the wall 108 is preferably also measured by the optical acquisition unit since the wall thickness can vary. If the wall thickness in the region to be worked on the wall 108 of workpiece 10 is determined in this manner before the shaping of the raised or recessed structure 102, 104 on wall 108, the heat source capacity and the travel speed can be corrected based on the measured wall thickness in order to further increase the precision in the working of the wall 108 of the workpiece 10.

Alternatively, or additionally, the degree of reshaping is measured by the optical acquisition unit if a still higher precision is to be attained. By measuring the degree of reshaping, the travel speed and energy introduction or heat source capacity can be increased or decreased accordingly in order to attain a predetermined nominal value of the deformation of the structure.

In order to prevent, furthermore, the flowing of the softened structure through too slow a cooling, the cooling process is preferably accelerated by applying a gas stream onto the deformed sites. In such a manner the precision of the deformation can be further increased. For the gas stream, nitrogen is preferably utilized, however, any other inert gas or air can also be utilized in order to cool the structure appropriately fast.

To apply the pressure difference in the interior of the hollow volume 50, the opening must be closed. This takes place preferably through an aluminum tub. Aluminum has the advantage of good heat removal in order to prevent the deformation, such as, for example, of a corrugation of the tub due to the introduced heat. The tub is preferably sealed off by a seal 52 against the wall 108, wherein the seal comprises, for example, silicone. This offers the advantage of good sealing and simultaneously of high thermal durability. However, any other sealing material can also be utilized.

The drinking glass 1 depicted in FIG. 3 has a bottom 30, a stem 20 and a cup 10. This drinking glass 1 is produced by known compression molding and blowing and is cooled. Raised and/or recessed structures 102, 104 are subsequently formed on the cup 10 using the method according to the invention. For this purpose, an opening 106 of cup 10 is sealed off, for example, by means of a (not shown) silicone-coated aluminum plate.

The invention is not limited to the formation of raised and recessed structures on a planar plate or on the cup 10 of a glass 1. Rather, the structures can also be formed on any other workpiece 10 which has a wall 108 which is sealable or can be sealed by means of a hollow body 50.

Through the method according to the invention, for example, letters or logos and the like can be applied on workpieces of glass, synthetic material, metal, etc. with very high precision. It offers especially the advantage of a highly precise formation of the structures which generate the impression of high quality. In particular in high-grade workpieces and products as well as glass series, such as are utilized for wine glasses, champagne goblets, etc., the high-grade appearance is of extraordinary importance.

What is claimed is:

1. A method for the generation of raised and/or recessed structures on a workpiece comprising the steps:

disposing a hollow body on one of a first side and a second side of the workpiece, wherein said hollow body is a separate member from the workpiece applying a pressure difference between the first side of a wall of the workpiece and a second side substantially opposite thereto;

local heating of the wall of the workpiece by a heat source to a softening temperature of the workpiece in order to induce local deformation of the wall of the workpiece, wherein the local heating is carried out by a laser beam generated by a $CO_2$ laser;

traversing a predetermined path with the heat source;

controlling or regulating the heat source capacity and/or the travel speed of the heat source; and cooling of the workpiece.

2. The method as claimed in claim 1, further comprising the step of acquiring the position and/or contour of the workpiece by means of an optical acquisition unit and calculating the predetermined path of the heat source based on the acquired position and/or contour of the workpiece.

3. The method as claimed in claim 1, wherein the step of cooling is carried out by applying a gas stream onto the workpiece.

4. The method as claimed in claim 1, further comprising the step of sealing the hollow body thereon by means of a seal.

5. A method for the generation of raised and/or recessed structures on a workpiece comprising the steps:

applying a pressure difference between one side of a wall of the workpiece and another side substantially opposite thereto;

local heating of the wall of the workpiece by a heat source to a softening temperature of the workpiece in order to induce local deformation of the wall of the workpiece;

traversing a predetermined path with the heat source;

controlling or regulating the heat source capacity and/or the travel speed of the heat source;

acquiring the position and/or contour of the workpiece by means of an optical acquisition unit and calculating the predetermined path of the heat source based on the acquired position and/or contour of the workpiece;

continuously measuring the wall thickness of the wall during generation of raised and/or recessed structures and correcting the travel speed and/or heat source capacity in response to the measured wall thickness; and cooling of the workpiece.

6. A method for the generation of raised and/or recessed structures on a workpiece comprising the steps:

applying a pressure difference between one side of a wall of the workpiece and another side substantially opposite thereto;

local heating of the wall of the workpiece by a heat source to a softening temperature of the workpiece in order to induce local deformation of the wall of the workpiece;

traversing a predetermined path with the heat source;

controlling or regulating the heat source capacity and/or the travel speed of the heat source;

acquiring the position and/or contour of the workpiece by means of an optical acquisition unit and calculating the predetermined path of the heat source based on the acquired position and/or contour of the workpiece;

continuously measuring a degree of reshaping of the workpiece during such reshaping and correcting the travel speed and/or heat source capacity in response to the measured degree of reshaping; and cooling of the workpiece.

7. A method for the generation of raised and/or recessed structures on a workpiece, wherein the workpiece comprises a hollow body, the method comprising the steps:

closing an opening of the hollow body by means of a plate, wherein said plate is a silicone-coated aluminum plate;

applying a pressure difference between one side of a wall of the workpiece and another side substantially opposite thereto;

local heating of the wall of the workpiece by a heat source to a softening temperature of the workpiece in order to induce local deformation of the wall of the workpiece; and cooling of the workpiece.

\* \* \* \* \*